United States Patent [19]

Kishikawa et al.

[11] 3,915,929
[45] Oct. 28, 1975

[54] REINFORCED POLYOLEFIN COMPOSITION AND ITS PRODUCTION

[75] Inventors: Hiroshi Kishikawa, Toyonaka; Kanji Yoshikawa; Yoshiharu Tatsukami, both of Niihama; Hiroshi Katsuki, Toyonaka, all of Japan

[73] Assignee: Sumitomo Chemical Company, Limited, Osaka, Japan

[22] Filed: Aug. 31, 1973

[21] Appl. No.: 393,292

Related U.S. Application Data

[63] Continuation-in-part of Ser. No. 167,468, July 29, 1971, abandoned.

[30] Foreign Application Priority Data

July 30, 1970  Japan............................... 45-067078
Dec. 29, 1970  Japan............................... 45-124376

[52] U.S. Cl. ........ 260/42.18; 260/42.14; 260/42.15; 260/836
[51] Int. Cl. ............................................. C08f 45/10
[58] Field of Search............ 260/41 AG, 836, 42.18, 260/42.15

[56] References Cited
UNITED STATES PATENTS

| | | | |
|---|---|---|---|
| 2,953,551 | 9/1960 | White | 260/86.7 |
| 3,696,069 | 10/1972 | Schrage | 260/41 R |

FOREIGN PATENTS OR APPLICATIONS

1,095,700  12/1967  United Kingdom............ 260/41 AG

OTHER PUBLICATIONS

Raff, R. A., Crystalline Olefin Polymers, Part II, 1964, Interscience Pub., New York, pp. 263-264.

*Primary Examiner*—James H. Derrington
*Attorney, Agent, or Firm*—Stewart and Kolasch, Ltd.

[57] ABSTRACT

A reinforced polyolefin composition which comprises a polyolefin, glass fibers and an ethylene-unsaturated glycidyl monomer-ethylenically unsaturated monomer terpolymer obtained by polymerizing 35 to 95.9 parts by weight of ethylene with 0.1 to 20 parts by weight of an unsaturated glycidyl monomer and 4 to 45 parts by weight of any other polymerizable ethylenically unsaturated monomer, containing the unsaturated glycidyl monomer unit in an amount of 1 to 45% by weight and the ethylenically unsaturated monomer unit in an amount of 4 to 45% by weight and having an intrinsic viscosity of 0.1 to 4.5 dl/g in tetralin solution at 135°C; the contents of the glass fibers and of the ethylene-unsaturated glycidyl monomer-ethylenically unsaturated monomer terpolymer being respectively 5 to 60% by weight and 0.1 to 25% by weight (based on the total weight of the composition).

4 Claims, No Drawings

REINFORCED POLYOLEFIN COMPOSITION AND ITS PRODUCTION

This is a continuation-in-part application of application Ser. No. 167,468, filed July 29, 1971 now abandoned.

The present invention relates to a reinforced polyolefin composition and its production. More particularly, it is concerned with a reinforced polyolefin composition comprising polyolefin, glass fibers and an ethylene-unsaturated glycidyl monomer-ethylenically unsaturated monomer terpolymer and its production.

Hitherto, it has been known that polyolefins can be improved in mechanical strength, size stability, heat resistance and the like by incorporating glass fibers therein. In the case, however, that the adhesiveness between the polyolefin and glass fiber is not good, a sufficient reinforced effect is not obtained. In order to increase the adhesiveness of polyolefin to glass fiber, it has been proposed to incorporate therein a silane compound such as an aminosilane (e.g. γ-aminopropyltriethoxysilane) and an ethylene copolymer (e.g. ethylene-acrylic acid copolymer) as coupling agents [Belgian Pat. No. 724,028]. This procedure is considerably effective in increasing the impact strength but is almost ineffective for improvement of other mechanical properties such as tensile strength and bending strength. In addition, the improving effect in the said procedure largely depends on the chemical bond between the silane compound and the ethylene copolymer so that the use of the silane compound in a considerably large amount is essential.

As the results of an extensive study, it has been found that the incorporation of an ethylene-unsaturated glycidyl monomer-ethylenically unsaturated monomer copolymer into a composition comprising a polyolefin and glass fibers is quite effective in improvement of the adhesiveness between the polyolefin and the glass fibers and also of the mechanical strength, the size stability, the heat resistance and the cold resistance of the composition.

The present invention is derived from such finding and is directed to a reinforced polyolefin composition which comprises polyolefin, glass fibers and an ethylene-unsaturated glycidyl monomer-ethylenically unsaturated monomer terpolymer.

As the polyolefin in the composition of this invention, there may be exemplified ethylene homopolymer, ethylene-vinyl acetate copolymer, propylene homopolymer, propylene copolymer, butene-1 homopolymer, butene-1 copolymer, 4-methylpentene-1 homopolymer, 4-methylpentene-1 copolymer and the like. These polyolefins may be employed alone or in admixture with any other polymers.

The glass fiber to be employed in the composition of the invention is ordinarily treated or not with a surface treating agent such as a silane compound (e.g. vinyltriethoxysilane, vinyltris(β-methoxyethoxy)silane, γ-methacryloxypropyltrimethoxysilane, γ-glycidoxypropyltrimethoxysilane) and is usually bundled in chopped strands or in a roving state by the use of an appropriate polymer (e.g. polyvinyl acetate, polyester, epoxy resin) as a binder.

The amount of the glass fiber to be incorporated into the composition of the invention may be from 5 to 60% by weight, preferably from 10 to 40% by weight, on the basis of the total weight of the composition. In case that the glass fiber is less than 5% by weight, the increase of the mechanical strength and the heat resistance will not be realized. When the glass fiber is more than 60% by weight, mixing of the individual fibers with the polymers will be difficult.

The ethylene-unsaturated glycidyl monomer-ethylenically unsaturated monomer copolymer includes the copolymer of ethylene, at least one of the unsaturated glycidyl monomers and at least one of any other polymerizable ethylenic monomers, inclusively. The term "unsaturated glycidyl monomer" hereinabove used is intended to mean a polymerizable monomer having at least one unsaturation and at least one epoxy group in the molecule and includes the following compounds:

1. Unsaturated glycidyl esters of the formula:

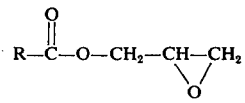

2. Unsaturated glycidyl ethers of the formula:

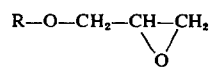

3. Epoxyalkenes of the formula:

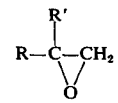

wherein R is a hydrocarbon group having an ethylenic unsaturation and R' is hydrogen or methyl. More specifically, the unsaturated glycidyl monomers include glycidyl acrylate, glycidyl methacrylate, allyl glycidyl ether, 2-methylallyl glycidyl ether, styrene-p-glycidyl ether, 3,4-epoxy-1-butene, 3,4-epoxy-3-methylbutene, 3,4-epoxy-1-pentene, 3,4-epoxy-3-methylpentene, 5,6-epoxy-1-hexene, etc. As the polymerizable ethylenically unsaturated monomers, there may be exemplified styrene, vinyl esters (e.g. vinyl acetate, vinyl propionate, vinyl benzoate), alkyl acrylates (e.g. methyl acrylate, ethyl acrylate, propyl acrylate, butyl acrylate, 2-ethylhexyl acrylate, cyclohexyl acrylate, dodecyl acrylate, octadecyl acrylate), alkyl methacrylates (e.g. methyl methacrylate, ethyl methacrylate, propyl methacrylate, butyl methacrylate, 2-ethylhexyl methacrylate, cyclohexyl methacrylate, dodecyl methacrylate, octadecyl methacrylate), maleic anhydride, maleic acid monoesters (e.g. monomethyl maleate, monoethyl maleate, monobutyl maleate, monocyclohexyl maleate, mono-2-ethylhexyl maleate, monododecyl maleate, monooctadecyl maleate), maleic acid diesters (e.g. dimethyl maleate, diethyl maleate, dibutyl maleate, dicyclohexyl maleate, di-2-ethylhexyl maleate, didodecyl maleate, dioctadecyl maleate), vinyl chloride, vinyl ethers (e.g. vinyl methyl ether, vinyl ethyl ether), N-vinyllactams (e.g. N-vinylpyrrolidone, N-vinylcaprolactam), acrylamides, sec-vinylcarboxamides, N-vinyl-N-alkylcarboxamides, etc. Among these polymerizable ethylenic monomers, the use of vinyl acetate and acrylic esters is particularly preferred.

The ethylene-unsaturated glycidyl monomer-ethylenically unsaturated monomer terpolymer may be prepared, for instance, by polymerizing ethylene with the unsaturated glycidyl monomer and the polymerizable ethylenically unsaturated monomer. The ratio of ethylene, the unsaturated glycidyl monomer and the polymerizable ethylenically unsaturated monomer to be polymerized is 35 to 95.9 : 0.1 to 20 : 4 to 45 in weight, preferably 55 to 91.8 : 0.2 to 15 : 8 to 30 in weight. The polymerization can be accomplished, for instance, by contacting the said polymerizable monomers with a conventional free radical catalyst at a temperature of 40° to 300°C under a pressure of 50 to 4000 atm. The free radical catalyst may be used in an amount of 0.0001 to 1% by weight on the basis of the total weight of the polymerizable monomers. As the free radical catalyst, there may be used di-t-butyl peroxide, t-butyl peroxy-2-ethylhexanoate or the like.

The ethylene-unsaturated glycidyl monomer-ethylenically unsaturated monomer terpolymer contains the unsaturated glycidyl monomer unit in an amount of 1 to 45% by weight, preferably 2 to 35% by weight, and the ethylenically unsaturated monomer unit in an amount of 4 to 45% by weight, preferably 8 to 30% by weight, and has an intrinsic viscosity of 0.1 to 4.5 dl/g, preferably 0.5 to 2 dl/g, when determined in tetralin solution at 135°C. When the content of the unsaturated glycidyl monomer unit is less than 1% by weight and that of the ethylenically unsaturated monomer unit is less than 4% by weight, the resulting copolymer will not produce any desired improvement in the mechanical properties in an incorporation range as hereinafter specified.

The incorporation of each copolymer over the specified range rather results in the loss of the favorable mechanical properties. The ethylene-unsaturated glycidyl monomer-ethylenically unsaturated monomer terpolymer containing the unsaturated glycidyl monomer unit in an amouont of more than 45% by weight and the ethylenically unsaturated monomer unit in an amount of more than 45% by weight is extremely inferior in its compatibility with the polyolefin and is not suitable for use in this invention.

The copolymer having an intrinsic viscosity of 0.1 to 45 dl/g, preferably 0.5 to 2 dl/g, is admixed with the polyolefin to form a uniform composition.

The amount of the ethylene-unsaturated glycidyl monomer-ethylenically unsaturated monomer terpolymer to be incorporated into the composition of the invention may be from 0.1 to 25% by weight, preferably from 0.2 to 10% by weight, on the basis of the total weight of the composition. When less than 0.1% by weight of the ethylene-unsaturated glycidyl monomer-ethylenically unsaturated monomer terpolymer is employed, a sufficiently improved result is not obtained. An amount of the ethylene-unsaturated glycidyl monomer-ethylenically unsaturated monomer terpolymer of more than 25% by weight is unnecessary and uneconomical.

The mixing of the polyolefin (which may be in the form of a molding powder, pellets, granules or the like), the glass fibers and the ethylene-unsaturated glycidyl monomer-ethylenically unsaturated monomer terpolymer (which is usually pulverized) may be preferably accomplished in a sealed vessel by agitating mildly. Vigorous agitation is not favored, because it may result in breaking the glass fibers. Still, the ethylene-unsaturated glycidyl monomer-ethylenically unsaturated monomer terpolymer may be previously incorporated with an appropriate stabilizer. Furthermore, the composition of the invention may be admixed with a pigment, a filler or any other additive, if desired.

For production of a molded article, the composition of the invention may be molded directly by the aid of a conventional molding machine. Further, it may be first pelletized and then molded in a conventional manner.

In the alternative, the ethylene-unsaturated glycidyl monomer-ethylenically unsaturated monomer terpolymer may be directly melted on the glass fibers and then the resulting substance admixed with the polyolefin to form a uniform composition.

Practical and presently preferred embodiments of the present invention are illustratively shown in the following Examples wherein the heat distortion temperature, the tensile strength, the bending strength and the Charpy impact strength were determined according to the tests described in ASTM D648-56 (highest fiber stress, 18.6 kg/cm$^2$), ASTM D638-64T, ASTM D790-63 and ASTM D256-56T, respectively.

EXAMPLE 1

In a 260 ml volume reactor made of stainless steel equipped with an agitator, the air was replaced by oxygen free ethylene. After the pressure was reduced, di-t-butyl peroxide (3.5mg), glycidyl methacrylate (2 g), vinyl acetate (1 g) and acetone (15 ml) were charged, ethylene was introduced therein and the agitation was started. The reaction was initiated at a temperature of 150°C under a pressure of 1,500 atm. After 39 minutes, the pressure was lowered to 1,250 atm. Then, the reactor was cooled and released to atmospheric pressure whereby an ethylene-glycidyl methacrylate-vinyl acetate terpolymer (9.9 g) was obtained. The elementary analysis and the infrared spectroscopy analysis revealed the presence of the glycidyl methacrylate unit in an amount of 22.4% by weight and the vinyl acetate unit in an amount of 0.71% by weight. The intrinsic viscosity of the terpolymer in tetraline solution determined at 135°C was 0.55 dl/g.

The above obtained ethylene-glycidyl methacrylate-vinyl acetate copolymer (0.5 part by weight) and glass fibers (length, 6 mm; diameter, 10 $\mu$; E-glass; surface treating agent, $\gamma$-aminopropyltriethoxysilane; bundling agent, epoxy resin) (30 parts by weight) were mixed together, and polyethylene powder of high density (melt index, 6.0) (69.5 parts by weight) was incorporated therein. The resulting composition was extruded at a resin temperature of 240°C by the aid of an extruder of 30 mm$\phi$ in nozzle diameter and then pelletized. The pellets were shaped by the aid of a 5 oz. screw type injection molding machine at a resin temperature of 270°C, a mold temperature of 50°C and a screw back pressure of 10 kg/cm$^2$ to make test strips. Measurement of the physical properties on the test strips afforded the following results: heat distortion temperature, 120°C; tensile strength, 737 kg/cm$^2$; bending strength, 866 kg/cm$^2$; Charpy impact strength, 13.2 kg-cm/cm$^2$. The test strips prepared from the composition, into which the said copolymer was not incorporated, gave the following results: heat distortion temperature, 115°C; tensile strength, 599 kg/cm$^2$; bending strength, 643 kg/cm$^2$; Charpy impact strength, 5.4 kg-cm/cm$^2$.

EXAMPLE 2

The ethylene-glycidyl methacrylate-vinyl acetate terpolymer obtained as in Example 1 (0.5 part by weight) and glass fibers (30 parts by weight) were mixed together, and polypropylene (intrinsic viscosity, 1.8) (69.5 parts by weight) was incorporated therein. As in Example 1, the resulting composition was pelletized and shaped to make test strips, of which the physical properties were measured to give the following results: heat distortion temperature, 138°C; tensile strength, 628 kg/cm²; bending strength, 746 kg/cm². The test strips prepared from the composition, into which the said terpolymer was not incorporated, gave the following results: heat distortion temperature, 115°C; tensile strength, 426 kg/cm²; bending strength, 599 kg/cm².

EXAMPLE 3

As in Example 1, di-t-butyl peroxide (25.0 mg), ethylene allyl glycidyl ether (20 g) and methyl acrylate (1 g) were charged in a reactor, and the reaction was initiated at 150°C under 1,500 atm. After 57 minutes, the pressure was lowered to 1,250 atm. The reactor was cooled and released to atmospheric pressure whereby an ethylene-allyl glycidyl ether-methyl acrylate terpolymer (9.7 g) was obtained. The elementary analysis and the infrared spectroscopy analysis revealed the presence of the allyl glycidyl ether unit in an amount of 12.1% by weight and the methyl acrylate unit in an amount of 10% by weight. The intrinsic viscosity in tetraline solution determined at 135°C was 1.04 dl/g.

The above obtained ethylene-allyl glycidyl ether-methyl acrylate terpolymer (0.5 part by weight) and glass fibers (30 parts by weight) were mixed together, and polyethylene powder (melt index, 6.0) (69.5 parts by weight) was incorporated therein. The resulting composition was pelletized and shaped as in Example 1 to make test strips, of which the physical properties were measured to give the following results: heat distortion temperature, 116°C; tensile strength, 737 kg/cm²; bending strength, 866 kg/cm² ; Charpy impact strength, 13.2 kg-cm/cm²; bending modulus, 36,000 kg/cm².

EXAMPLE 4

Into a 50 l volume reactor made of stainless steel equipped with an agitator, glycidyl methacrylate (2.8 kg/hr), vinyl acetate (1.0 kg/hr) and ethylene (200 kg/hr) were continuously fed, and the reaction was carried out using t-butyl peroxy-2-ethylhexanoate (15 g/hr) at a temperature of 195°C under a pressure of 1,250 kg/cm², whereby an ethylene-glycidyl methacrylate-vinyl acetate (88 : 11 : 1 by weight) terpolymer (melt index, 1.2) (23 kg/hr) was obtained.

As in Example 1, the above obtained terpolymer (0.5 part by weight) and glass fibers (30 parts by weight) were mixed together, and polyethylene powder of high density (melt index, 6.0) (69.5 parts by weight) was incorporated therein. The resulting composition was pelletized and shaped to make test strips, of which the physical properties were measured to give the following results: heat distortion temperature, 122°C; tensile strength, 754 kg/cm²; bending strength, 896 kg/cm²; Charpy impact strength, 13.5 kg-cm/cm²; bending modulus, 41,500 kg/cm².

EXAMPLE 5

Ethylene-glycidyl methacrylate-vinyl acetate (89.6 : 2.4 : 8.0 by weight) terpolymer (I) (melt index, 2.5) (0.5 part by weight ) and glass fibers (30 parts by weight) were mixed together, and high density polyethylene powder (melt index, 6.0 ) (69.5 parts by weight) was incorporated therein. As in Example 1, the resulting composition was pelletized and shaped to make test strips, of which the physical properties were measured to give the values in Table 1.

For comparison, an ethylene-glycidyl methacrylate (97.6 : 2.4 by weight) copolymer (II) (melt index, 2.5) was used in the same procedure as above, from which the results are also given in Table 1.

Table 1

| Copolymer | Heat distortion temperature (°C) | Tensile strength (kg/cm²) | Bending strength (kg/cm²) | Charpy impact strength (kg-cm.cm²) |
|---|---|---|---|---|
| I | 116 | 719 | 888 | 10.8 |
| II | 115 | 668 | 742 | 6.1 |

What is claimed is:

1. A reinforced polyolefin composition which comprises a polyolefin, glass fibers and a terpolymer of ethylene, an unsaturated glycidyl monomer selected from the group consisting of unsaturated glycidyl esters of the formula:

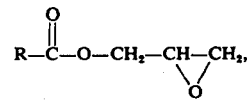

unsaturated glycidyl ethers of the formula:

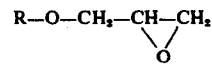

and epoxyalkenes of the formula:

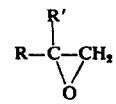

wherein R is a hydrocarbon group having an ethylenic unsaturation and R' is hydrogen or methyl, and vinyl acetate, said terpolymer being obtained by polymerizing 35 to 95.9 parts by weight of ethylene with 0.1 to 20 parts by weight of said unsaturated glycidyl monomer and 4 to 45 parts by weight of said vinyl acetate, the resulting terpolymer containing 1 to 45% by weight of the unsaturated glycidyl monomer unit and 4 to 45% by weight of the vinyl acetate unit and having an intrinsic viscosity of 0.1 to 4.5 dl/g in tetralin solution at 135°C., the content of said glass fibers and of said terpolymer being, respectively, 5 to 60% by weight and 0.1 to 25% by weight, said polyolefin comprising the balance of said composition.

2. The reinforced polyolefin composition according to claim 1, wherein the amount of the glass fibers is from 10 to 40% by weight on the basis of the total weight of the composition.

3. The reinforced polyolefin composition according to claim 1, wherein the polyolefin is selected from the group consisting of ethylene homopolymer and propylene homopolymer.

4. The reinforced polyolefin composition according to claim 1, wherein the unsaturated glycidyl monomer is selected from the group consisting of glycidyl acrylate, glycidyl methacrylate and allyl glycidyl ether.

* * * * *